Patented Nov. 11, 1924.

1,514,666

UNITED STATES PATENT OFFICE.

IVAN EMILE LANHOFFER AND OSCAR EDMOND LANHOFFER, OF PARIS, FRANCE.

PROCESS FOR THE MANUFACTURE OF SHEETS, PANELS, AND OTHER ARTICLES IN CEMENT AND ASBESTOS AND ARTICLES MADE THEREBY.

No Drawing.   Application filed December 4, 1922.   Serial No. 604,887.

*To all whom it may concern:*

Be it known that we, IVAN EMILE LANHOFFER, citizen of the Republic of France, and a resident of Paris, post-office address 10$^{bis}$ Avenue de la Grande Armee, and OSCAR EDMOND LANHOFFER, citizen of the Republic of France, and a resident of Paris, post-office address 10$^{bis}$ Avenue de la Grande Armee, have invented a new and useful Process for the Manufacture of Sheets, Panels, and Other Articles in Cement and Asbestos and Articles Made Thereby, which process is fully set forth in the following specification.

It is well known that hydraulic cement, and particularly Portland cement, in admixture with asbestos forms valuable compositions.

The present invention has for its object a new process for the manufacture of a composition with a base of hydraulic cement, (more particularly Portland cement), and asbestos, which lends itself extremely well to molding of great fineness, and which is capable of numerous applications such as the formation of sheets, panels or any other objects, the new composition being adapted to be painted, polished and coloured in any way.

The hereinafter described composition of asbestos and cement, as compared with others made with the same cement, presents a considerable mechanical resistance.

Not only does the tensile resistance attain several hundred kilograms per square centimetre, whilst that of the better quality ordinary mortars attains at the most only 45, but the resistance to wear is also considerably increased. The new composition has moreover a marked elasticity which is entirely absent in those obtained with ordinary mortars.

The present invention relates not only to the process hereinafter described but also to the product obtained by the said process.

The process of manufacture is carried out in the following manner:—

The first operation is to disintegrate the asbestos to a suitable extent. It is well known that asbestos is composed of fibres of extreme fineness. Certain kinds furnish such fine fibres that the strongest magnifications of a good microscope are required to study their texture. In this state of subdivision asbestos no longer seems a simple inert body when added to cement. It certainly plays an important physical and possibly also a chemical part, in the phenomena of crystallization which characterize the hardening, to which the results obtained are attributed.

The disintegration of the asbestos is effected in the cold or in the warm, in a large excess of water; for example, in a rag engine, or in any other suitable apparatus. The asbestos is sufficiently disintegrated when a weight of water equal to 20 times that of the asbestos becomes a thick pulp of fibres. In this operation the asbestos seems to have swollen to a considerable extent. The above proportions are however only given by way of example.

To the thus disintegrated asbestos is added very finely ground Portland cement. The fibres are instantly covered with said cement and keep it also in suspension. This is the known clarifying power of finely divided fibres. Thereupon all the cement is added which the fibres are capable of retaining, they themselves undergoing a violent mixing action in the water. The cement is thus washed with a large quantity of water and in which it leaves behind all its soluble salts as well as a part of the calcium hydrate it contains.

After the mortar has thus been prepared and washed, all the excess of water is removed by filtration (with filter presses, or paper- or cardboard machines), by centrifugal drying machine or in any other suitable manner.

Thus treated the mortar forms a moist relatively dense and compact mass which can be transformed by suitable means into a powder of greater or less degree of fineness according to the purpose for which it is required.

By way of a simple example cylindrical steel brushes revolving at a high speed may be employed for this transformation, the moist mortar mass being subjected to the action of said brushes.

The finer the bristles of the brushes the finer will be the powder obtained. For the highest degrees of fineness required, these brushes may be provided with case-hardened fittings, When the powder is to be used it is spread over the matrices or molds in a regular layer. The powder may be applied to the matrices or moulds in several ways in accordance with the subsequent operations to which it may be subjected, and the spreading may be effected mechanically or manually. The thickness of the layer is regulated in accordance with the thickness of the plate or panel to be obtained. Care should be taken to strengthen the coating in the least accessible hollows of the mold as well as at the places where the corners or projections of the molded article require it.

The powder may be splashed violently against the mold for example by means of a compressed air blast. In this case the layer obtained is very compact and tight, and when the layer has attained the desired thickness, it needs but to be allowed to harden before being lifted from the mold.

If on the other hand the method of spreading employed does not result in a sufficiently compact layer, the layer obtained is firmly pressed against the mold by means of a diaphragm press or if a hollow article is to be obtained by means of a rubber or the like bag placed inside the object, which is distended by water under pressure or by any other suitable device.

For objects, the reverse side of which is easily accessible, as for example, sheets, the hydraulic pressure of a diaphragm press may be replaced by any suitable beating which will not allow the powder to escape during the continued action of the beaters.

Preferably, for this purpose appliances are employed which are able to fit themselves as nearly as possible to the surface by them beaten, such as bags filled with granulated metal or metal filings, bags of plastic material filled with liquid or the like.

Finally, a great saving may be effected in the amount of powder used, and very good external moldings may be obtained by interposing between the layer and the beating tools, a plate of asbestos and cement, which has not yet hardened.

For this purpose, the mold is covered with only a thin coating of powdered mortar, except in the deep cavities where the thickness of the coating should increase in proportion to the depth relatively to the width.

Thereupon, the mold and the coating are covered with a flat sheet of fibro-cement, eternite or any other material of a similar composition, freshly made and the hardening of which has not yet commenced, and the whole is subjected to a light and prolonged beating; for example, by the projection of balls of any suitable material, of solid bodies or of liquids, in short, any masses adapted during their fall or projection to act equally well upon the cavities as upon the projections of the mold and to cause the powdered mortar and the backing plate to penetrate into its cavities.

Thus treated, the mortar adheres to this plate completely, and forms with it, as soon as hardening has taken place, an integral and homogeneous material.

With a cement of a suitable grain, it is possible by this process to obtain very fine and detailed reproductions in the mold, which in consequence of the above-described treatment of the mortar, contain only a very small proportion of active chemical material, and which are adapted to receive coatings of paints, polishes, or colourings of any kind.

Thus, all kinds of woods, gophered leather, and fired stoneware and other ceramics may be imitated so as to be taken for the genuine article and by using metallization processes (electroplating, Schoop or like processes), copper, bronze, etc., may be imitated.

Certain colors may also be mixed with the mortar prepared in the above-described manner, so as to color an upper layer into the mass.

By projecting against the mold (for instance, by means of a rotatable brush or broom, or in any other manner), mortars brought to a suitable consistency, and colored in the above-described manner to imitate any kind of marble, and by directing these sprays in such a manner as to obtain a division of the colors corresponding to the chracteristics and to the veins of the marble considered, it is possible with a little experience and skill to obtain good reproductions of marble of any description.

The surfaces are polished by the usual processes after hardening is complete. For such reproductions it is advantageous to employ white cement, which does not detract from the brightness of the colours, but the supporting plate may, nevertheless, be prepared from ordinary cement provided that its shrinkage and its properties in respect of dilation and capillarity are substantially the same as those of the white cement used.

Finally, certain salts or finely divided metals, which do not affect the hardening, and which after hardening allow by chemical reaction, various colours to be obtained, for example, salts of iron, chromium, lead, and the like may be incorporated with the mortar.

As can be seen, the characteristic of the process independently of the degree of disintegration of the asbestos, consists in molding a powdered mortar composed of cement and asbestos. It should however be well understood that the application of said mortar under the aforementioned conditions is within the scope of the invention, irrespective of the degree of disintegration of the asbestos; it should nevertheless be borne in mind that the finer the disintegration of the asbestos, the greater will be the fineness, mechanical resistance and elasticity of the molded products.

We claim as our invention:

1. The process of manufacturing molded cement articles, which comprises the steps of forming a wet mortar from disintegrated asbestos and ground cement, transforming the mortar into a powder, applying a layer of powder against a mold, and then removing the molded layer; substantially as described.

2. The process of manufacturing molded cement articles, which comprises disintegrating asbestos in an excess of water, mixing ground cement with the disintegrated asbestos to form a mortar, removing the excess water from the mortar, transforming the mortar thus treated into a powder, applying a layer of powder against a mold, and then removing the molded layer; substantially as described.

3. The process of manufacturing molded cement articles, which comprises disintegrating asbestos in an excess of water to form a thick pulp of fibers, adding finely-ground cement to the pulp while subjecting the same to a violent mixing action, removing all the excess water from the mixture to form a moist, relatively-dense and compact mass, transforming said mass into a powder, applying a layer of powder against a mold, and then removing the molded layer; substantially as described.

4. The process of manufacturing molded cement articles, which comprises the steps of forming a wet mortar from disintegrated asbestos and ground cement, removing the excess water from the mortar, transforming the mortar into a powder, spreading the powder in a layer over a mold, tamping the layer against the surface of the mold, and then removing the tamped and molded layer.

5. The process of manufacturing molded cement articles, which comprises the steps of forming a wet mortar from disintegrated asbestos and ground cement, removing the excess water from the mortar, transforming the mortar into a powder, spreading the powder in a layer over a mold, tamping the layer against the surface of the mold with masses of small detached solid bodies, and then removing the tamped and molded layer.

6. The process of manufacturing molded cement articles, which comprises the steps of forming a wet mortar from disintegrated asbestos and ground cement, removing the excess water from the mortar, transforming the mortar into a powder, spreading the powder in a layer over a mold, interposing against said layer a freshly-made backing plate of asbestos and cement which has not yet hardened, beating said plate to tamp said layer against the surface of the mold and to unite said layer and plate, and then removing the tamped and molded layer with its attached backing plate.

7. The process of manufacturing molded cement articles, which comprises the steps of forming a wet mortar from disintegrated asbestos and ground cement, removing the excess water from the mortar, transforming the mortar into a powder, spreading the powder in a layer over a mold, interposing against said layer a freshly-made backing plate of asbestos and cement which has not yet hardened, beating said plate with masses of small detached solid bodies to tamp said layer against the surface of the mold and to unite said layer and plate, and then removing the tamped and molded layer with its attached backing plate.

8. The process of manufacturing molded cement articles, which comprises the steps of forming a wet mortar from disintegrated asbestos and ground cement, removing the excess water from the mortar, transforming the mortar into a powder, incorporating coloring material into the powder, spreading the colored powder in a layer over a mold, interposing against said layer a freshly-made uncolored backing plate of asbestos and cement which has not yet hardened, beating said plate to tamp said layer against the surface of the mold and to unite said layer and plate, and then removing the tamped and molded layer with its attached backing plate.

9. The herein-described molding material, consisting of a mixture of disintegrated asbestos and finely-ground cement made into a mortar which is thereafter transformed into a powder.

10. The herein-described molding material, consisting of a mixture of a thick pulp of asbestos fibers and finely-ground cement made into a mortar from which the excess water has been removed and which is transformed into a powder.

In testimony whereof we have signed this specification in the presence of two subscribing witnesses.

IVAN EMILE LANHOFFER.
OSCAR EDMOND LANHOFFER.

Witnesses:
    JULES TOUSSET,
    GEORGES PASCAL CARRIERE.